Patented Jan. 10, 1950

2,494,510

UNITED STATES PATENT OFFICE 2,494,510

POLYMERIZATION OF PROPYLENE IN THE PRESENCE OF ISOBUTANE

Everett C. Hughes, Cleveland Heights, and Harrison M. Stine, East Cleveland, Ohio, assignors, by mesne assignments, to The Polymerization Process Corporation, Jersey City, N. J., a corporation of Delaware No Drawing. Application September 20, 1946, Serial No. 698,394

3 Claims. (Cl. 260—683.15)

The present invention relates to the polymerization of propylene to form low boiling hydrocarbon polymers within motor fuel boiling range, useful as fuel components.

It has been proposed heretofore to polymerize mixtures of normally gaseous hydrocarbons comprising olefins to form polymers within the motor fuel boiling range. This is accomplished by thermal or catalytic reaction of the components. Catalytic agents such as sulfuric acid, phosphoric acid, metal halides and certain clays are commonly used. Some specific olefins are more difficult to polymerize in view of a tendency of the polymerization reaction to fall short of or pass over the desired polymer product. This is particularly the case with propylene, and propylene has never been regarded as practical commercially for use as a starting material to form polymerized motor fuel components, unless the propylene is in admixture with butylenes in amounts sufficient to have effect on the polymerization reaction. Control of propylene polymerization to attain motor fuel products formed only upon a desired degree of polymerization, has been difficult to achieve.

It is highly desirable to polymerize propylene without butylenes since the latter can be used in alkylation processes leaving propylene as a raw material for motor fuel manufacture if it can be polymerized effectively to form motor fuel products.

It is an object of the present invention to provide an improved method of polymerizing propylene to obtain an optimum yield of a desired polymer useful as a motor fuel component.

A further object is to provide an improved method of polymerizing propylene obtaining a considerably increased yield, or an increased flow rate of reactants at a desired rate of polymerization or conversion.

A further object is to provide an improved method of polymerizing propylene in the presence of catalysts commonly known as "polymerization catalysts" whereby the reaction may be controlled to produce an optimum of a desired polymer product.

A further object is to provide an improved method of polymerizing propylene in the absence of butylenes, to obtain a desired motor fuel polymer.

Still a further object is to provide an improved method of polymerizing propylene in the presence of a polymerization catalyst, substantially increasing the percentage polymerization of the propylene in the reaction charge, attaining a desired polymer product distribution over the range of possible reaction products.

Other objects and advantages of the invention will be apparent from the following detailed description, setting forth illustrative embodiments of the invention.

In accordance with the present invention, propylene, a normally gaseous olefin hydrocarbon, is polymerized under conditions of advanced temperature and pressure in the presence of isobutane and a solid polymerization catalyst, to produce useful motor fuel components.

The propylene starting material employed may be obtained from a variety of sources. For example, propylene may be derived from the catalytic dehydrogenation of saturated hydrocarbons. A more common source may comprise refinery gases obtained as a by-product of cracking, destructive hydrogenation or other thermal processes for the treatment of hydrocarbons. In all cases, the propylene component should be substantially free of other unsaturated olefinic hydrocarbons, for example, butylene, by fractionating the refinery gases to produce a $C_3$ cut, or other means. If appreciable amounts of butylenes are present in the reaction charge, they take part in the reaction, undesirably modifying the carbon atom content of the polymer product and reducing the degree of propylene conversion. By "appreciable amounts" is meant sufficient butylenes present to influence the propylene polymerization reaction. The presence of inert saturated hydrocarbons such as the paraffins in the reaction charge, is without consequence, and fractionated refinery gases containing propylene and inert hydrocarbons, may be treated directly in accordance with the invention without further separation. From the standpoint of efficiency and economy, the $C_3$ cut should preferably contain a minimum of 20% propylene by weight, to obtain an acceptable yield of polymer, and may comprise up to 100% propylene. Under the conditions of reaction hereinafter prescribed, the propylene constituent may be polymerized to approximating optimum yield, the reaction being stabilized and controlled to obtain the desired motor fuel component without the usual loss of active propylene constituent due to non-polymerization, without deviation of the polymers formed from the desired carbon atom content, and particularly without the occurrence of undesirable side chain reactions.

In accordance with the invention, the catalytic polymerization of the propylene is carried out in the presence of isobutane. While the mechanics of the reaction are not clear, it is evident that the isobutane functions as a reaction controlling agent and in the capacity of a catalytic promoter, for little to no isobutane is lost in the reaction. The reaction is to be distinguished, in this regard, from alkylation and other reactions wherein isobutane enters into the reaction as an active constituent.

The isobutane employed may be obtained from the commonly available sources mentioned heretofore. It may be obtained by isomerization of normal butane, or may be obtained by hydrogenation of isobutylene. The concentration of isobutane in the propylene reaction charge may vary from 5% to 50% of the total charge by weight, the remainder of the charge preferably being the $C_3$ cut comprising propylene. Greater amounts of isobutane may be added, but generally do not increase the polymer yield, and in some instances have been found to decrease the yield. As the isobutane is not dissipated in carrying out the method, it may be recovered and reemployed in further reactions, if desired.

The solid catalyst employed in combination with the isobutane component may comprise any catalyst of the large group commonly known as "polymerization catalysts" employed in hydrocarbon polymerization reactions. Catalysts conventionally referred to as alkylation catalysts are generally not suitable for use with the invention in that they lend to production of undesirable side reactions. The improved propylene polymer yield of the invention accrues from the use of these known polymerization catalysts in the presence of isobutane. Generally, any solid polymerization catalyst is suitable. These catalysts, for example, may include phosphorous and phosphoric acids, fuller's earth, absorbent carbonaceous compounds, carbonates of the alkaline metals, oxides of aluminum, calcium, magnesium and beryllium, the acids of boron, thorium, and antimony, adsorbent clays such as bentonite, siliceous earths, copper alkali metal salts, phosphates such as copper pyrophosphates, borates, antimoniates, metal boron halides such as chromium fluoborate, metals such as tin, zinc, aluminum, chromium, silicon, lead, and alloys of these metals.

The solid catalysts may be prepared by any suitable method, and may be employed individually or in combination. The catalyst desirably may be incorporated in or deposited on an inert carrier such as dried alumina, thoria, zirconia, alumina gel, kieselguhr, silica gel, charcoal and the like, to obtain maximum activity through surface exposure. The carrier may be wet or dry at the time the catalyst is deposited.

By way of example, a suitable active catalyst may be formed by impregnating dried activated alumina with an aqueous solution of chromium, tin or aluminum fluoborate. An illustrative catalyst may be prepared as follows:

90 grams of $Cr(NO_3)_3.9H_2O$ were dissolved in 200 milliliters of $H_2O$. The resulting solution was treated with sufficient $NH_4OH$ to completely precipitate the hydrous chromium oxide. The precipitate was filtered, washed, and dissolved in 140 grams of 45% aqueous solution of fluoboric acid. The solution was diluted with water to 300 milliliters and added to 300 milliliters of dried alumina gel. Adsorption of the chromium fluoborate on the alumina gel may be accelerated by intermittent application of vacuum to the system. Excess solution was removed and the catalyst dried for 10 hours at 180° F. and then further dried at 950° F. in the presence of dry air. The catalyst thus prepared is quite stable, showing no decrease in activity upon regeneration with air at 950° F.

The alumina may be a variety available commercially, or may be prepared by precipitation of an aqueous $AlCl_3$ solution by the addition of ammonium hydroxide, the precipitate being washed and dried at an elevated temperature.

The impregnation of the carrier may also be carried out by adding just enough chromium fluoborate solution to saturate the alumina. The amount necessary may be determined easily by simple experimentation, the carrier generally supporting about 10% of the active catalyst constituent.

As an example of an active catalyst employed with a wet carrier, the following is submitted:

Alumina gel in amount equivalent to 248 grams of $Al(OH)_3$ prepared as described above, was slurried and 29 grams of potassium nitrate added. Potassium fluoborate was then precipitated by the addition of 56 grams of a 45% aqueous solution of fluoboric acid, forming the active catalyst in the wet support or carrier.

The reaction conditions may vary over a very wide range, depending upon several factors and combinations of factors, such as the concentration of propylene in the reaction charge, the activity of the catalyst selected, the contact time of the reactants, the temperature and pressure employed, the flow rate of the propylene isobutane reaction charge over the catalytic agent, and whether the reaction is effected in the liquid or vapor phase.

The propylene polymerization reaction may be carried out with the propylene in a dense gaseous phase or a liquid phase. As example of satisfactory reaction conditions from the standpoint of speed of reaction and economy of cost, temperatures of 250°–550° F., preferably 350°–500° F., with pressures of 200 to 1500, preferably 500 to 1500, pounds per square inch, are preferred.

The flow rate of the propylene isobutane reaction charge over the catalytic agent may be between 0.1 to 10, preferably 0.5 to 2, volumes of liquid phase hydrocarbon measured at room temperature, per volume of catalyst per hour.

It is to be understood that the above data are given to illustrate one suitable way of carrying out the invention, and are not definitive in a limiting sense of the inventive concept. The reaction conditions may be varied in great degree without departing from the invention. Various polymerization catalysts promote the reaction favorably in the presence of isobutane under widely varying conditions of temperature and pressure. The critical consideration resides in the selection of such a combination of reaction conditions as will promote propylene polymerization and carry on the reaction at an accelerated rate, yet which will not lend to a setting up of a parallel decomposition or so-called "reforming" reaction, such as may occur when too severe conditions of pressure, temperature and time of contact with the catalyst, are imposed on the reaction charge.

In order to more clearly set forth the advantages of the invention, the result of propylene polymerization under a suitable combination of reaction conditions, are set forth in Table I. In carrying out the polymerization, the propylene-isobutane reaction charge was passed over a catalyst of chromium fluoborate supported in a carrier of alumina gel, under a pressure of 1000 lbs./sq. in. and a temperature of 375° F. The rate of flow was one volume of hydrocarbon per volume of catalyst per hour, based on the total reaction charge.

Table I

| Charge, Wt. Per Cent: | | | | |
|---|---|---|---|---|
| Propylene | 100 | 75.7 | 100 | 75 |
| Isobutane | --- | 24.3 | --- | 25 |
| Products: | | | | |
| Propylene | 53 | 9.3 | 50 | 8 |
| Propane | --- | --- | --- | --- |
| Isobutane | --- | 22 | --- | 24.5 |
| Boiling above Pentane | 47 | 68.8 | 50 | 67.5 |
| Conversion of Propylene, Per Cent | 47 | 88 | 50 | 89 |

The results shown clearly indicate the superiority quantitatively of the desired propylene polymer yield, when the polymerization reaction is carried out over a polymerization catalyst in the presence of isobutane. In the absence of isobutane, the conversion of propylene was only 47%, whereas with 24% isobutane in the reaction charge the propylene conversion was 88% (columns 1 and 2). At a reaction temperature of 425° F., the conversion ratio was increased from 47% to 89%, by the addition of 25% isobutane to the reaction charge. There was practically no conversion of isobutane.

In order further to illustrate the advantages of the invention, the results of propylene polymerization with a different catalyst are set forth in Table II. In carrying out the polymerization the propylene and the propylene-isobutane reaction charges were passed over a catalyst comprising copper pyrophosphate under a pressure of 1000 pounds per square inch, at a temperature of 375° F., and at a flow rate of 1 volume of hydrocarbon per volume of catalyst per hour.

Table II

| Charge, Wt. Per Cent: | | |
|---|---|---|
| Propylene | 100 | 75 |
| Isobutane | --- | 25 |
| Conversion of Propylene, Per Cent | 80 | 90 |

While in this example the improvements are not as striking as in the previous example, because the copper pyrophosphate is one of the best catalysts for propylene conversion, the marked increase in yield by the use of isobutane in accordance with the invention is clearly apparent. There was practically no conversion of the isobutane.

While the invention has been described in detail with reference to specific polymerization catalysts and reaction conditions, the many possible variations thereof within the scope of the invention have been pointed out and further modification will be apparent to one skilled in the art. It is intended that the invention be limited only as defined in the following claims.

We claim:

1. A process of polymerizing propylene to form normally liquid hydrocarbons useful as a motor fuel component, which comprises forming a reaction charge of propylene and isobutane, said reaction charge being substantially free of butylene and the isobutane being present in a proportion of from 5% to 50% by weight of the reaction charge, and passing the reaction charge over a polymerization catalyst selected from the group consisting of phosphoric acids and phosphate catalysts at a temperature between about 350° and 500° F. and a pressure between about 200 and 1500 pounds per square inch to form normally liquid olefinic polymers as the primary reaction product of the propylene, said isobutane being substantially unreacted.

2. A process of polymerizing propylene to form normally liquid hydrocarbons useful as a motor fuel component, which comprises contacting propylene, in the presence of isobutane and substantially free of butylene, with a solid phosphoric acid polymerization catalyst at a temperature between about 350° and 500° F. and a pressure between about 200 and 1500 pounds per square inch to form normally liquid olefinic polymers as the primary reaction product of the propylene, said isobutane being substantially unreacted.

3. A process of polymerizing propylene to form normally liquid hydrocarbons useful as a motor fuel component, which comprises contacting propylene, in the presence of isobutane and substantially free of butylene, with a copper pyrophosphate polymerization catalyst at a temperature between about 350° and 500° F. and a pressure between about 200 and 1500 pounds per square inch to form normally liquid olefinic polymers as the primary reaction product of the propylene, said isobutane being substantially unreacted.

EVERETT C. HUGHES.
HARRISON M. STINE.

REFERENCES CITED

The following references are of record in the file of this patent:

UNITED STATES PATENTS

| Number | Name | Date |
|---|---|---|
| 2,158,353 | Chaffee | May 16, 1939 |
| 2,172,542 | Morrell | Sept. 12, 1939 |
| 2,401,865 | Gorin et al. | June 11, 1946 |